United States Patent [19]

Allen

[11] 3,919,642

[45] Nov. 11, 1975

[54] LOW COST TELEMETER FOR MONITORING A BATTERY AND DC VOLTAGE CONVERTER POWER SUPPLY

[75] Inventor: Floyd Allen, Washington, D.C.

[73] Assignee: The United States of America as represented by the Secretary of the Army, Washington, D.C.

[22] Filed: May 17, 1974

[21] Appl. No.: 470,778

Related U.S. Application Data

[63] Continuation-in-part of Ser. No. 358,565, May 9, 1973, abandoned.

[52] U.S. Cl............. 325/113; 325/145; 340/207 R; 340/224
[51] Int. Cl.² .......................................... H04B 1/04
[58] Field of Search ............. 325/113, 133, 67, 145, 325/152, 155, 163, 185, 186; 331/46, 48, 49, 54, 55; 178/66 A; 340/183, 177 R, 207 R, 213, 205, 201 R, 224, 249; 324/187

[56] References Cited
UNITED STATES PATENTS

| | | | |
|---|---|---|---|
| 2,451,347 | 10/1948 | McShan | 340/207 R |
| 2,491,387 | 12/1949 | Miller | 178/66 A |
| 2,764,754 | 9/1956 | Garfield | 340/205 |
| 2,924,789 | 2/1960 | Kuck | 325/67 |
| 3,252,154 | 5/1966 | McKee et al. | 340/213 |
| 3,360,605 | 12/1967 | Burke | 325/163 |

Primary Examiner—Benedict V. Safourek
Assistant Examiner—Jin E. Ng
Attorney, Agent, or Firm—Nathan Edelberg; Robert P. Gibson; Saul Elbaum

[57] ABSTRACT

A telemetry circuit for monitoring the battery and DC-to-DC converter voltages of a projectile fuze which includes a frequency modulated transmitter to which signals are fed alternately from a pair of voltage-controlled oscillators. The output frequency of each voltage-controlled oscillator are determined by the battery voltage and the converter output voltage of a fuze circuitry, respectively. A constant frequency signal is provided by a relaxation oscillator to define the sampling rate by which the two DC voltages are monitored on a time-sharing basis. The constant frequency signal is fed to a pair of transistor switches which alternately disable each of the two voltage-controlled oscillators such that the outputs of each of the voltage-controlled oscillators, which comprise a frequency varying modulation signal, are alternately fed to the frequency modulated transmitter.

7 Claims, 2 Drawing Figures

LOW COST TELEMETER FOR MONITORING A BATTERY AND DC VOLTAGE CONVERTER POWER SUPPLY

RIGHTS OF THE GOVERNMENT

The invention described herein may be manufactured, used, and licensed by or for the United States Government for Governmental purposes without the payment to me of any royalty thereon.

CROSS REFERENCE TO RELATED APPLICATION

This application is a continuation-in-part of application Ser. No. 358,565, filed May 9, 1973, now abandoned.

BACKGROUND OF THE INVENTION

1. Field of the Invention

The present invention is related to telemetry systems for monitoring electronic functions of fuze circuits used in projectiles and, more particularly, is related to a low-cost telemetry system that monitors two DC voltages produced in a fuze battery power supply on a time-sharing basis.

2. Description of the Prior Art

Fuze laboratories have long depended on the use of sophisticated IRIG (Inter Range Instrument Group) multi-channel telemetry system to monitor both fuze and batttery field tests. In conventional IRIG telemetry systems, the data channels operate continuously and employ a commutator to obtain time-sampled information. The accuracy and amount of information furnished by such telemetry systems is only necessary for measuring fuze parameters other than battery power supply parameters. The presently available sophisticated multi-channel telemetry systems usually exceed the requirements necessary to accurately monitor the DC voltages of a fuze's battery power supply. Moreover, the cost of IRIG telemetry systems becomes prohibitive in large volume battery power supply test programs.

SUMMARY OF THE INVENTION

It is therefore a primary object of the present invention to provide a novel and unique telemetry system for monitoring two DC voltages produced by a fuze's battery power supply on a time-sharing basis.

Another object of the present invention is to provide a telemetry system having two data channels for monitoring two DC voltages in which the need for continuous operation of the data channels is obviated.

A further object of the present invention is to provide a telemetry system in which the output information is obtained from a frequency modulated transmitter whose modulation signal is alternately obtained from the two data channels on a periodic basis.

A still further object of the present invention is to provide a telemetry system and circuit which is inexpensive to produce and economical to utilize in the field testing of fuze battery power supplies on a large scale.

The foregoing and other objects are attained in accordance with one aspect of the present invention through the provision of a telemetry circuit for monitoring a pair of DC voltages in a projectile fuze which comprises a pair of voltage-controlled oscillators which produce a pair of varying frequency signals in accordance with the variations in the two DC voltages monitored. A frequency modulated transmitter receives as a modulation signal the outputs from the voltage-controlled oscillators on a periodic basis. Control means are provided to alternately disable the pair of voltage-controlled oscillators such that only one modulating signal is provided to the frequency modulated transmitter at any given time. The control means preferably include a relaxation oscillator for providing a fixed frequency signal and a pair of transistor switches each responsive to alternating cycles of the fixed frequency signal from the relaxation oscillator. The transistor's switches disable their respective voltage-controlled oscillators by effectively grounding the frequency determining capacitor thereof. The period of disablement of each voltage-controlled oscillator is preferably set to be one-half the period of oscillation of the fixed frequency relaxation oscillator.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which.

DETAILED DESCRIPTION OF A PREFERRED EMBODIMENT

Figure 1:
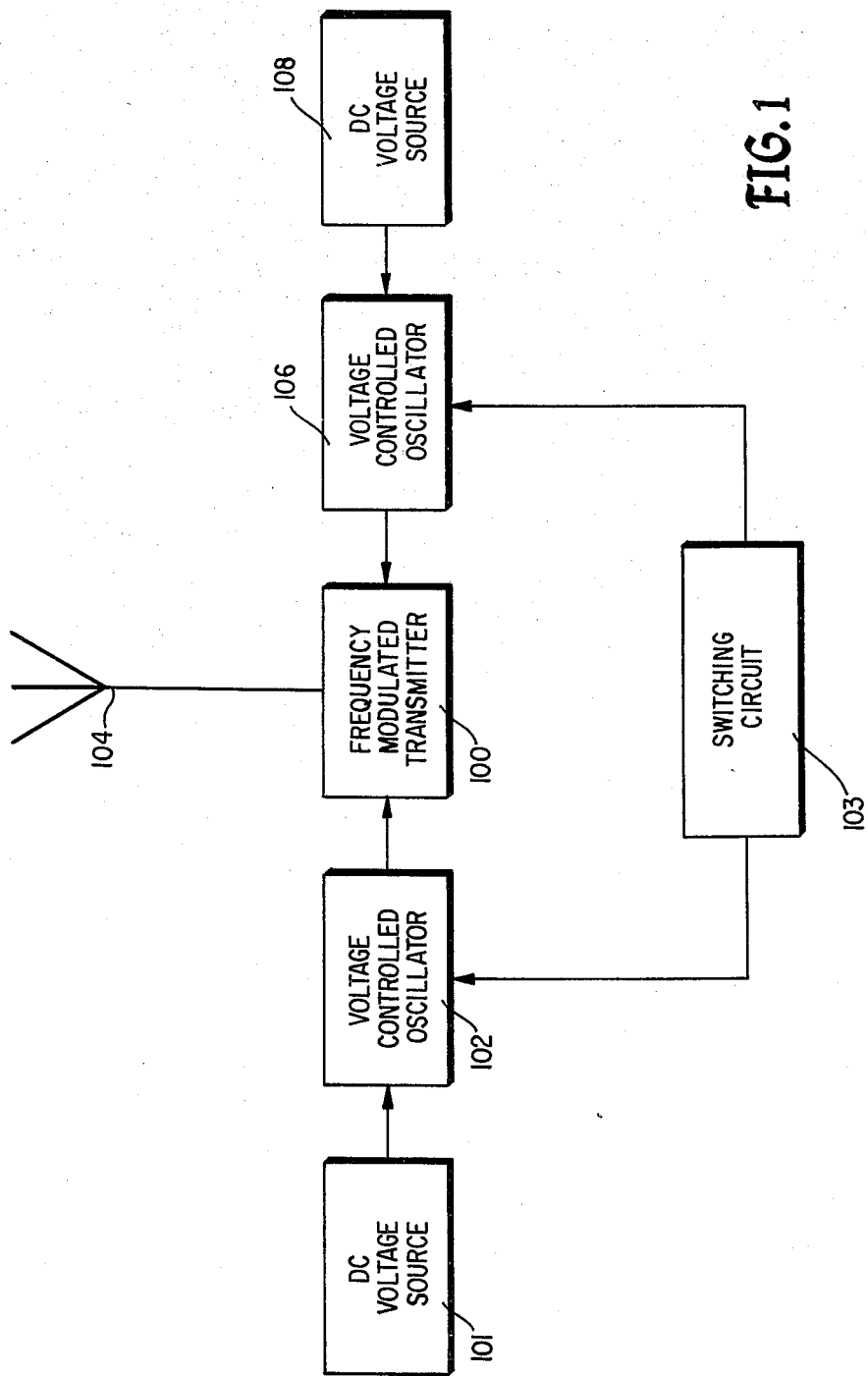
FIG. 1 is a block diagram illustrative of the essential components of the telemetry system according to the present invention.

The present invention will be more easily understood in broad aspects by reference to FIG. 1 which illustrates a block diagram of the major electronic components which comprise the present invention. The system of the present invention as seen in FIG. 1 comprises a pair of DC voltage sources 101 and 108, a pair of voltage-controlled oscillators 102 and 106, a frequency modulated transmitter 100 with associated antenna 104, and a switching circuit 103. DC voltage source 101 may comprise, for example, a battery voltage in a projectile fuze which may vary from zero to 1.5 volts. DC voltage source 108 may, for example, comprise the output of a DC-to-DC converter normally present in a battery power supply circuit for a projectile fuze whose voltage ranges from zero to 32 volts. The object of the system depicted in FIG. 1 is to economically monitor the DC voltages from voltage source 101 and voltage source 108.

Voltage-controlled oscillator 102 is connected to receive the DC voltage signal from DC voltage source 101 and to produce a frequency varying signal at its output which is fed to frequency modulated transmitter 100. The frequency of the output signal from voltage-controlled oscillator 102 is, as is well known in the art, proportional to the signal received from DC voltage source 101 at its input. Similarly, voltage-controlled oscillator 106 receives at its input the output voltage from DC voltage source 108 and delivers at its output a frequency varying signal to frequency modulated transmitter 100. The frequency of the output signal from voltage-controlled oscillator 106 is likewise directly proportional to the magnitude of the input DC voltage received from voltage source 108.

The output frequency varying signals from voltage-controlled oscillators 102 and 106 are fed as modulating signals to frequency modulated transmitter 100 for combination with a carrier wave and transmission via antenna 104. In order to ensure that frequency modulated transmitter 100 is provided with only one modulation signal at any given time, a switching circuit 103 is connected to each of the voltage-controlled oscillators 102 and 106 is alternately and periodically disable their outputs. Switching circuit 103 preferably comprises a fixed frequency time base which defines the sampling period of each voltage-controlled oscillator 102 and 106 and means responsive to the fixed frequency signal for alternately disabling the respective VCO's. In other words, switching circuit 103 permits the frequency varying signal from voltage-controlled oscillator 102 to be fed into frequency modulated transmitter 100 for a certain period of time, after which VCO 102 is disabled while simultaneously VCO 106 is enabled to provide its frequency varying output signal to frequency modulated transmitter 100.

Figure 2:
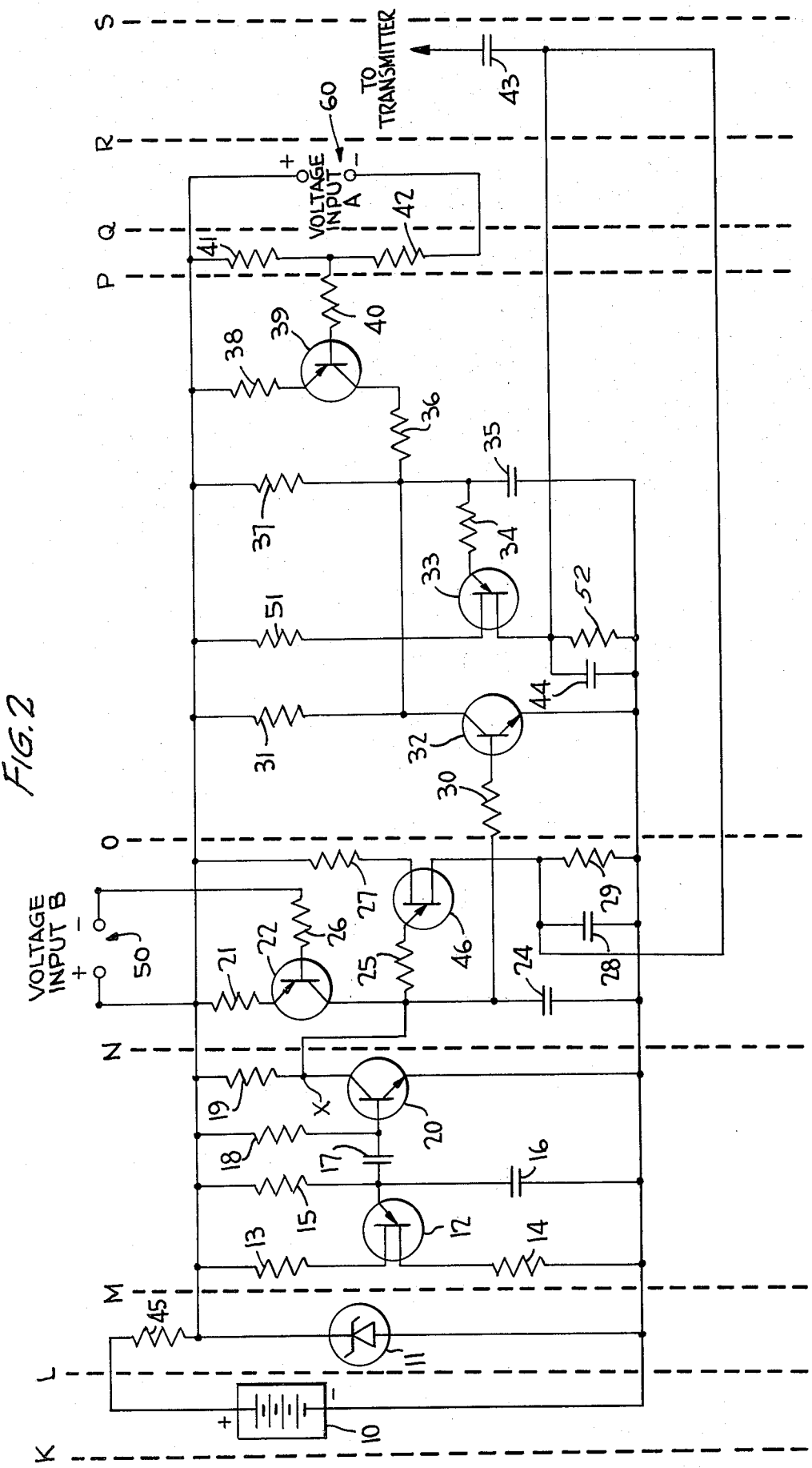
FIG. 2 is a detailed circuit diagram comprising a specific embodiment of the telemetry system in accordance with the present invention.

Referring now to FIG. 2, there is shown a detailed circuit diagram of a specific embodiment of the telemeter circuitry of the present invention wherein the two DC voltages to be monitored are fed into the circuit at terminals 50 and 60, respectively. Certain portions of the schematic circuit diagram of FIG. 2 which correspond to the functional blocks illustrated in FIG. 1 are separated by vertical dashed lines having letter designations. For example, betwen lines M and N in FIG. 2 is illustrated the major portion of the switching circuit 103 of FIG. 1, while between lines N and O is illustrated the voltage-controlled oscillator 102 and between lines O and P appears the circuitry corresponding to voltage-controlled oscillator 106 of FIG. 1. DC voltage sources 101 and 108 of FIG. 1 are not specifically illustrated in FIG. 2 but appear at voltage input terminal B and at voltage input terminal A, respectively.

The voltage-controlled oscillator 102 preferably comprises a unijunction transistor 46 having a pair of bias resistors 27 and 29 connected to its respective bases. Emitter resistor 25 receives the input signal to unijunction transistor 46 from a frequency determining resistance network comprised essentially of the parallel combination of resistor 19 and transistor 22, and a frequency determining capacitor 24. Transistor 22 includes an emitter resistor 21 and a base resistor 26 to which are applied the DC voltage input B at terminal 50. The conductance of transistor 22 is controlled by the voltage input at terminal 50, i.e., the voltage of the DC power supply which is being monitored. In the well-known manner, the variation in the conductance of transistor 22, in combination with resistor 19 and capacitor 24, cause linearly corresponding changes in the output frequency signal of unijunction transistor 46.

Voltage-controlled oscillator 106 may be of like or similar construction to that just described for voltage-controlled oscillator 102. In FIG. 2, the oscillating transistor of VCO 106 is seen to comprise a unijunction transistor 33 having bias resistors 51 and 52 connected to its respective bases. An emitter resistor 34 feeds the input signal to unijunction transistor 33. The frequency determining portion of the input to unijunction transistor 33 comprises a resistor 37 in parallel with a transistor 39, and capacitor 35. Transistor 39 includes emitter resistor 38 and base resistor 40 which are connected to receive the voltage divided signal applied to terminal 60. A voltage divider comprising resistors 41 and 42 is provided to adjust the normally high DC voltage appearing at voltage input A to the proper operating level for the transistor circuitry. In operation, as is well known, any linear changes in the DC voltage applied across terminal 60 varies the conductance of transistor 39 is such a manner so as to cause linearly corresponding changes in the frequency of the output signal of transistor 33.

It is therefore seen that the circuitry of FIG. 2 corresponding to voltage-controlled oscillators 102 and 106 provide a pair of frequency varying signals to the frequency modulated transmitter through a blocking capacitor 43. In order to ensure that only one of the frequency varying output signals from unijunction transistors 46 and 33 are fed to the transmitter at any given time, a control circuit is provided which essentially comprises a pair of transistor switches 20 and 32, and a relaxation oscillator circuit which consists essentially of a unijunction transistor 12, resistors 13, 14 and 15, and capacitor 16. Resistors 13 and 14 are connected to the respective bases of unijunction transistor 12, while resistor 15 and capacitor 16 are connected to the emitter input thereof. The constant frequency output signal developed by unijunction transistor 12 is fed through a coupling capacitor 17 to the base of switching transistor 20. It should be noted that transistor switches 20 and 32 are respectively connected across the frequency determining capacitances 24 and 35 of VCO's 102 and 106.

Proper operating voltages for the circuitry depicted in FIG. 2 is provided by means of a power supply 10 connected across a resistor 45 and a Zener diode 11.

In operation, switching transistor 20 is initially driven into hard conduction by means of the voltage supplied through a resistor 18 connected to its base. Capacitor 16 is being charged in accordance with the time constant determined by the resistance of resistor 15 and the capacitance of capacitor 16. When the charge across capacitor 16 reaches the firing point of unijunction transistor 12, the latter conducts to discharge the voltage from capacitor 16 to ground. This brings the base of transistor 20 to ground, thereby rendering transistor 20 non-conductive. Capacitor 16 again recharges to eventually render transistor 20 conductive. The frequency of oscillation of unijunction transistor 12 is preferably selected to be approximately 1 Hertz. Accordingly, the period of conduction and non-conduction of transistor 20 corresponds to approximately one-half cycle per second.

Initially, when transistor switch 20 is on and the voltage across capacitor 16 is increasing, point X at the collector of transistor 20 will be at an effective ground potential thereby turning off transistor switch 32 via the application of a ground potential through resistor 30. If transistor 32 is in its nonconductive state, its collector voltage will be high thereby permitting frequency determining capacitance 35 of unijunction transistor 33 to charge and thereby permit an output signal to issue from unijunction transistor 33 to be fed through blocking capacitor 43 to the frequency modulated transmitter to provide its modulating signal, as discussed above. During this time, capacitor 24 of VCO 102 is effectively shunted to ground due to the ground potential present at point X to thereby prevent an oscillating signal from issuing from unijunction transistor 46.

During the discharge of capacitor 16 through unijunction transistor 12, a point is reached whereby transistor 20 is rendered non-conductive. Point X therefore represents a point of high potential and accordingly capacitor 24 of VCO 102 is permitted to charge to thereby permit unijunction transistor 46 to deliver its frequency varying output signal. Simultaneously, transistor 32 is driven into conduction by virtue of the potential at point X delivered through base resistor 30. The conduction of transistor 32 effectively shunts frequency determining capacitance 35 to ground of VCO 106 to thereby prevent an output signal from issuing from unijunction transistor 33. Accordingly, during this cycle, the output from unijunction transistor 46, which corresponds to a frequency varying signal in direct proportion to the DC voltage change at terminal 50, is fed through blocking capacitor 43 to the frequency modulated transmitter as a modulating signal.

It is seen that the foregoing operation is cyclically repeated as a function of the period of oscillation of unijunction transistor 12. Switching transistors 20 and 32 are controlled by the fixed frequency signal across unijunction transistor 12 to alternately permit VCO's 102 and 106 to deliver a modulating signal to the frequency modulated transmitter. In this manner, the transmitter may alternately monitor the variations in the two DC voltages appearing across terminals 50 and 60 in a highly simplified manner.

It is seen that the foregoing telemetry system alleviates the need for the use of sophisticated multi-channel telemetry systems formerly required for monitoring battery field tests. Further, the telemetry circuit according to present invention is extremely inexpensive and economical to use in large volume fuze battery supply test programs. The circuit of the present invention is seen to differ from conventional telemetry systems wherein data channels operate continuously and employ an IRIG commutator to obtain sampled information, in that the present circuit alternately disables one data channel while the other is permitted to modulate the transmitter.

Obviously, numerous modifications and variations of the present invention are possible in light of the above teachings. It is therefore to be understood that within the scope of the appended claims the invention may be practiced otherwise than is specifically described herein.

What is claimed as new and desired to be secured by Letters Patent of the United States is:

1. A telemetry circuit for transmitting an F-M signal indicative of a pair of DC voltages in a projectile fuze, which comprises:
   first and second sources of varying DC voltages;
   first and second voltage-controlled oscillator means, each having an oscillation transistor and a frequency determining capacitor, responsive to the outputs from said first and second sources of DC voltages, respectively, for producing first and second oscillating signals whose frequencies are respectively proportional to the magnitude of said first and second DC voltage source outputs;
   means for transmitting a frequency modulated carrier wave which alternately receives said first and second oscillating signals for use as the modulating signal for said carrier wave; and
   control means for alternately disabling said first and second voltage controlled oscillator means whereby said transmitting means receives only a single modulating signal at any given time, said control means comprising means for producing a constant frequency oscillating signal and switching means responsive to said constant frequency oscillating signal for alternately grounding said frequency determining capacitor of said first and second voltage-controlled oscillator means, respectively.

2. The telemetry circuit according to claim 1 wherein each of said voltage-controlled oscillator means further comprises a frequency determining resistance means for receiving said output from the respective DC voltage source.

3. The telemetry circuit according to claim 2 wherein said switching means comprise first and second transistor switches which are alternately rendered conductive for a time period equivalent to one-half the period of oscillation of said constant frequency oscillating signal.

4. The telemetry circuit according to claim 3 wherein said means for producing a constant frequency oscillating signal comprises a relaxation oscillator which includes a unijunction transistor.

5. The telemetry circuit according to claim 4 wherein said constant frequency oscillating signal comprises a sawtooth signal having a frequency of approximately one Hertz.

6. The telemetry circuit according to claim 3 wherein said oscillation transistor of each of said voltage-controlled oscillator means comprises a unijunction transistor and wherein said frequency determining capacitor and said frequency determining resistance means are connected to the emitter of said unijunction transistor.

7. The telemetry circuit according to claim 6 wherein said frequency determining resistance means comprises the parallel combination of a resistor and a transistor, said transistor having an emitter, base and collector, said emitter and base of said transistor connected to receive said output from the respective DC voltage source.

* * * * *